US008751606B2

(12) United States Patent
Kim et al.

(10) Patent No.: US 8,751,606 B2
(45) Date of Patent: Jun. 10, 2014

(54) METHOD AND SYSTEM FOR REPLACING HYPERLINKS IN A WEBPAGE

(75) Inventors: Jin Soo Kim, Seoul (KR); Daniel Jim Roh, Seoul (KR); Ho Yun Lee, Seongnam (KR)

(73) Assignee: Yahoo! Inc., Sunnyvale, CA (US)

( * ) Notice: Subject to any disclaimer, the term of this patent is extended or adjusted under 35 U.S.C. 154(b) by 952 days.

(21) Appl. No.: 11/875,526

(22) Filed: Oct. 19, 2007

(65) Prior Publication Data

US 2009/0043874 A1    Feb. 12, 2009

(30) Foreign Application Priority Data

Aug. 10, 2007 (KR) .............................. 10-2007-80528

(51) Int. Cl.
*G06F 15/16* (2006.01)
*G06F 17/00* (2006.01)

(52) U.S. Cl.
USPC .......................................... 709/219; 715/206

(58) Field of Classification Search
USPC .......................................................... 709/219
See application file for complete search history.

(56) References Cited

U.S. PATENT DOCUMENTS

| | | | |
|---|---|---|---|
| 2002/0065671 A1* | 5/2002 | Goerz et al. .................... 705/1 |
| 2003/0046311 A1* | 3/2003 | Baidya et al. ................ 707/200 |
| 2003/0195884 A1* | 10/2003 | Boyd et al. ...................... 707/7 |
| 2004/0205503 A1* | 10/2004 | Gutta ........................ 715/501.1 |
| 2007/0118803 A1* | 5/2007 | Walker et al. ................ 715/744 |
| 2008/0086559 A1* | 4/2008 | Davis et al. .................. 709/224 |
| 2008/0177994 A1* | 7/2008 | Mayer ............................ 713/2 |
| 2011/0087648 A1* | 4/2011 | Wang et al. .................. 707/709 |
| 2012/0136723 A1* | 5/2012 | Larner et al. .............. 705/14.54 |

FOREIGN PATENT DOCUMENTS

JP       2001014208       1/2001
KR    1020030090178    11/2003

OTHER PUBLICATIONS

Notification of Preliminary Rejection for Korean Application No. 10-2007-80528, mailed May 28, 2009, 3 pages, Mailed May 28, 2009.
Translation of Korean Application No. KR 10-2007-80528, mailed May 28, 2009, 2 pages, Mailed May 28, 2009.
Notice of Preliminary Rejection for Korean Patent Application 10-2007-80528 and English translation, Nov. 30, 2009.

\* cited by examiner

*Primary Examiner* — Hamza Algibhah
*Assistant Examiner* — James Edwards
(74) *Attorney, Agent, or Firm* — Pillsbury Winthrop Shaw Pittman LLP

(57) ABSTRACT

There is provided a web service system for providing a web page, which includes at least one hyperlink, to a client. Said web service system may comprise: a client history server configured to store client history information; a content repository server configured to store one or more candidate hyperlinks; and a web server configured to provide a web page to a client. Said client history information may include at least one client identifier (ID) and at least one content ID corresponding thereto. Said web server may receive from said client a request for a web page, which may comprise a client ID of said client, and obtain from said content repository server at least one content ID corresponding to the client ID of said client. Further, said web server may access said content repository server to select at least one hyperlink to be included in the web page among the candidate hyperlinks stored in said content repository server based on the at least one obtained content ID.

22 Claims, 8 Drawing Sheets

| Client ID | Content ID |
|---|---|
| C1 | articleid = 20071010 |
| | articleid = 20070326 |
| | articleid = 20070730 |
| C2 | articleid = 20061010 |
| | ysl/9623 |
| C3 | ysl/uon |

FIGURE 3A

| Client ID | Tag | | | |
|---|---|---|---|---|
| articleid = 20071010 | Sports | BasketBall | NBA | Kobe Bryant |
| articleid = 20070326 | Sports | BasketBall | NBA | Koby Bryant |
| articleid = 20070730 | Sports | BasketBall | NCAA | 2007 |
| articleid = 20061010 | Entertainment | Movie | Action | Transformer |
| ysl/9623 | IT | Communication | WCDMA | RNC |
| ysl/uon | Religion | Christianity | Theology | UON |

FIGURE 3B

METHOD AND SYSTEM FOR REPLACING HYPERLINKS IN A WEBPAGE

TECHNICAL FIELD

The present invention generally relates to automatically replacing hyperlinks provided in a webpage.

BACKGROUND

As the Internet has become highly integrated into everyday life. Internet websites have emerged as an attractive new medium for relaying various content, such as news, shopping information, etc. Especially, portal sites such as Yahoo! work as a gateway to vast resources provided through the Internet. Such content is usually provided in the form of a web page, which may contain various hyperlinks to other web pages. These hyperlinks enable Internet users to easily navigate through a vast selection of content provided by the portal site. However, the number of hyperlinked objects that a web page can provide is quite limited. Further, the website operators do not necessarily update the hyperlinks provided in their webpage on a regular basis. Thus, the number of fresh contents that can be accessed via a web page decreases as the Internet users repeatedly visit the same web page. This inevitably leads to a decreased number of Internet users visiting the portal site. In addition, the types of hyperlinks provided in a web page are usually identical for all the Internet users visiting the portal site. Providing a web page with hyperlinks based on the visiting Internet user's web page access history and personal interests would vastly improve the quality of service provided by the portal site. However, there are no conventional means for website operators to automatically select and/or update the hyperlinks in their web page in a manner that best suits the need and interest of the visiting Internet user.

SUMMARY

The present invention provides a method and apparatus for automatically replacing hyperlinks in a web page provided by a web service system based on user preferences via a web service system for providing a web page, which includes one or more hyperlinks, to a client. Said web service system may comprise: a client history server configured to store client history information; a content repository server configured to store one or more candidate hyperlinks; and a web server configured to provide a web page to a client. Said client history information may include at least one client identifier (ID) and one or more content IDs corresponding thereto. Said web server may receive from said client a request for a web page, which may comprise a client ID of said client, and obtain from said client history server one or more content IDs corresponding to the client ID of said client. Further, said web server may access said content repository server to select one or more hyperlink to be included in the Web page among the candidate hyperlinks stored in said client history server based on the one or more obtained content IDs. In selecting the one or more hyperlinks to be included in the web page among the candidate hyperlinks stored at the content repository server, said web server may exclude one or more hyperlinks with a content ID identical to the obtained content ID.

In one embodiment, said client history server stores a tag for each of the content ID stored in the client history information and/or tag preference information for each of the client ID stored in the client history information. Further, said content repository server may store candidate hyperlink information for each of the candidate hyperlinks stored in the content repository server. Said candidate hyperlink information may include a tag for each of the candidate hyperlinks. Said web server may obtain from said client history server a tag for each of the obtained content IDs and obtain from said content repository server the hyperlink information for each of the candidate hyperlinks.

In another embodiment, said web server may select the hyperlink to be included in the web page based on said tag and said tag preference information. In yet another embodiment, said web server may prepare at said web server a tag table, wherein said tag table comprises one or more content IDs and one or more tags corresponding thereto. Said web server may then search a tag corresponding to each of the content ID obtained from the client history server by using the prepared tag table. In yet another embodiment, said web server may select among each of the candidate hyperlinks one or more hyperlinks with a tag identical or similar to the tag of each of the content ID obtained from the client history server as the hyperlink to be included in the web page. In still yet another embodiment, said web server may select the one or more hyperlinks to be included in the web page among the candidate hyperlinks based on a weight value assigned to each of the candidate hyperlinks.

In yet another embodiment, said web server may provide to said client a web page comprising one or more hyperlinks, wherein each of said hyperlink is linked with a content, and receive from said client a request for the content linked to the one or more hyperlinks. Said web server may then transmit to said client history server the client ID, the content ID and the tag included in said content request.

In other embodiments, said client may store therein the client history information. In this instance, said web server may receive from said client a client history information and a request for the web page, wherein said client history information comprises one or more content ID and said web page request comprises a client ID of said client and access said content repository server to select one or more hyperlink to be included in the web page among the candidate hyperlinks stored in said content repository server based on the received client history information. Said web server may receive said client history information in cookie information. Said web server, upon receiving the web page request and the cookie, may generate a web page with hyperlinks based on the client history information stored in the cookie, update the client history information in the received cookie and transmit the generated web page together with the updated cookie.

BRIEF DESCRIPTION OF THE DRAWINGS

FIG. 3a illustrates example client history information according to one embodiment of the present invention.

FIG. 3b illustrates an example tag table according to one embodiment of the present invention.

DESCRIPTION OF EXAMPLE EMBODIMENT(S)

Various embodiments of the present invention will be described below in detail with reference to the accompanying drawings. It will be apparent, however, that these embodiments may be practiced without some or all of these specific details. In other instances, well-known process steps or elements have not been described in detail so as not to unnecessarily obscure the description of the present invention.

Figure 1:
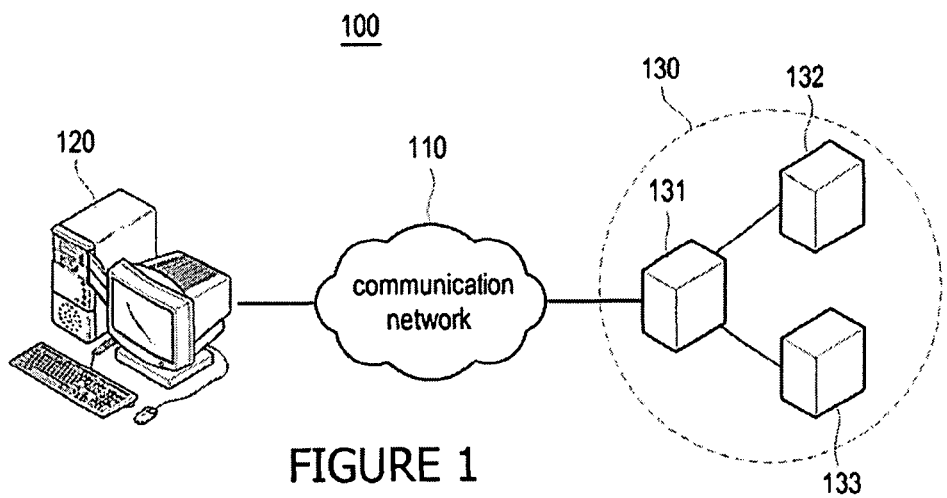
FIG. 1 illustrates a schematic diagram of a communication system according to one embodiment of the present invention.

FIG. 1 illustrates a schematic diagram of a communication system according to one embodiment of the present invention. Referring to FIG. 1, the communication system 100 includes: a communication network 110 such as the Internet; a user terminal (UT) 120 connected to the communication network 110; and a web service system 1330 providing a web page, which may include at least one hyperlink, to the user terminal 120 through the communication network 110. The user terminal 120 may be personal computers, notebooks or any other terminals with appropriate communication means to gain access to the web pages (e.g., a sports news web page) provided by the web service system 130 to its users. Although only one terminal 120 is illustrated in FIG. 1 for ease of explanation, it should be noted that more than one terminal may be connected to the communication network 110 to access the web service system 130.

For example, a user may connect to the web service system 130 through a client application (hereinafter referred to as "client") installed in the user terminal 120, such as a web browser (e.g., Netscape, Internet Explorer, etc.), to view the web page provided it the web service system 130 through the communication network 110. After the user establishes a connection with the website service system 130, the user terminal 120 may receive from the website service system 130 a web page in the form of a web page file (e.g., a hypertext markup language (HTML) file).

Figure 2A:
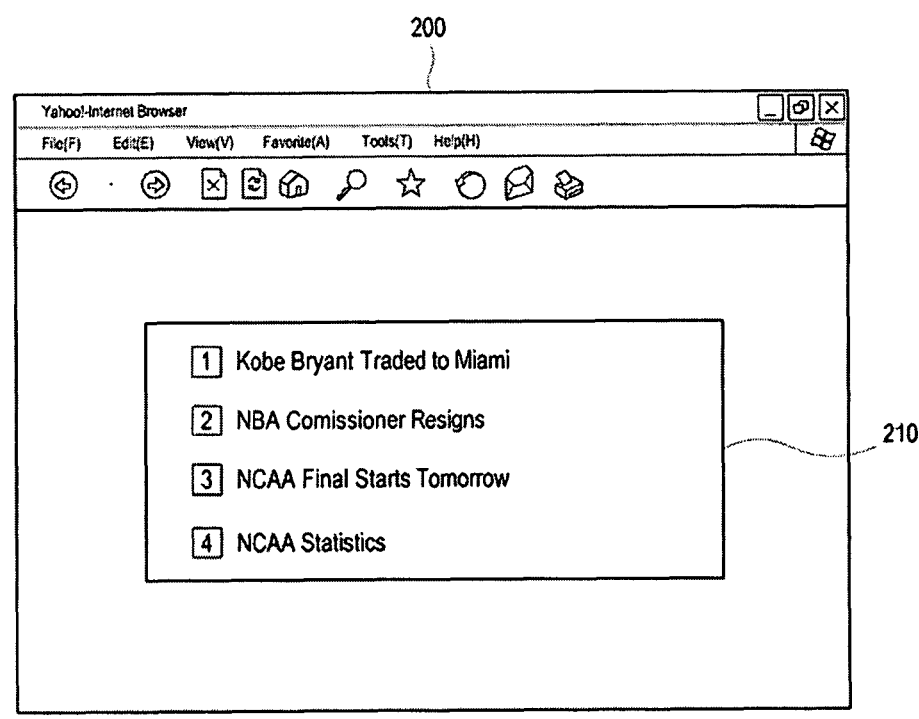
FIGS. 2a-2c illustrate example web pages according to one embodiment of the present invention.

The display screen for the web page file received from the web service system 130 may be prepared by the client running the user terminal 120. An example of the web page display screen is shown in FIG. 2a. Referring to FIG. 2a, the web page display screen, such as a web page display screen 200, may include a hyperlink portion 210 for displaying at least one hyperlink (FIG. 2a shows 4 hyperlinks), each of which provides a link to a content provided by the web service system 130 for easy access. Here, the content may include various types of information or data regarding a text, code, voice, sound or an image digitally processed and distributed to be provided through a wired and/or wireless electrical communication network. For example, such content may be text contents (e.g., news articles) and/or multimedia contents (e.g., pictures, movies, etc.). Still further, the content may be embodied in a web page consumed by the client application, or of a content type requiring a plug-in or separate client application, such as a media player or content-dependent viewer.

According to one embodiment, when the user selects one of the hyperlinks by clicking or placing a cursor on one of the hyperlinks displayed on the screen of the user terminal 120 through a user input interface (e.g., mouse, keyboard, etc.), the user terminal 120 generates a content request based on such user input. Here, the content request is a message requesting a web service system (e.g., a portal site such as Yahoo!) to provide content. An example of such content request includes a content web page request, which requests to provide a web page containing content (i.e., a content web page). The content web page includes certain "content," such as a news article, a motion picture or a blog page, and excludes web pages including only hyperlinks or banners that provide link to other web pages (e.g., a gateway page or a portal page, which is a web page initially provided to a user visiting a portal site). However, a content web page may include a hyperlink(s).

In one embodiment, the content request may include a client identifier (ID), which identifies the client that generated the content request, and a content ID that identifies the requested content. For example, the client ID may be a browser ID uniquely assigned to each web browser (or other client application) and/or a cookie provided by the web service system 130. In one implementation, the client ID may correspond to a user account. In one embodiment, the content ID may be a universal resource locator (URL) contained in a hyperlink selected by the user. In another embodiment, the content ID may be a value included in the URL that uniquely identifies the content located thereby. For example, when a news article is linked to a hyperlink, the hyperlink may be in a format as shown below:

Example 1 http://kr.news.yahoo.com/shellview.htm?linkid=63&articleid=2007071213561034519

Example 2 http://kr.news.yahoo.com/shellview.htm?articleid=2007070603200030382&linkid=rank_news&type=month&cate+ph&rank=2

From Examples 1 and 2, it can be seen that each URL linked to a new article contains a unique identifier "articleid." Thus, instead of using the entire URL, only the part thereof indicating the "articleid" may be used as the content ID.

In another example, the hyperlinks linked to blog web pages may be in a format as shown below:

Example 3 http://kr.blog.yahoo.com/achu68/2713.html

Example 4 http://kr.blog.yahoo.com/health_blog/7380.html

From Examples 3 and 4, it can be seen that each URL linked to a blog web page contains a unique string between the site name "kr.blog.yahoo.com" and the "html" extension. Thus, as for hyperlinks linked to blog web pages, only the string between the site name and the "html" extension contained in the URL need be used as a content ID.

The content ID may be implemented in various manners in accordance with the URL format employed by the web service system 130 and is not limited to the aforementioned examples. The user terminal 120 may transmit the generated content request to the web service system 130.

In one embodiment, the web service system 130 may include: a web server for providing a web page to the client of the user terminal 120; a content web server 132 for storing at least one candidate hyperlink, which may be included in the web page; and a client history server 133 for storing client history information, i.e. the history on the contents provided to the client of the user terminal 120 among the contents provided by the web service system 130.

The web server 130 may receive a content request (e.g., a content web page request) from the user terminal 120, extract a client ID and content ID from the received content request and transmit the extracted client and content IDs to the client history server 133. The web server 131 may obtain and transmit to the user terminal 120 the content indicated by the extracted content ID (e.g., a content web page). In one embodiment the web server 131 may store web pages and/or content provided by the web service system 130 and may process and provide in response to the client's request the corresponding web page(s) and/or content to the client. In another embodiment, the web server 131 may obtain the requested web page and/or content stored in another server (not shown) of the web service system 130 and provide them to the client.

The client history server may receive the client and content IDs from the web server 131 and use them to produce client history information. The client history information is a data structure that includes at least one client ID and at least one content ID corresponding thereto. FIG. 3a illustrates an example of the client history information and the description thereto will be explained in ensuing descriptions. The client history information indicates which clients accessed which information.

Figure 2B:
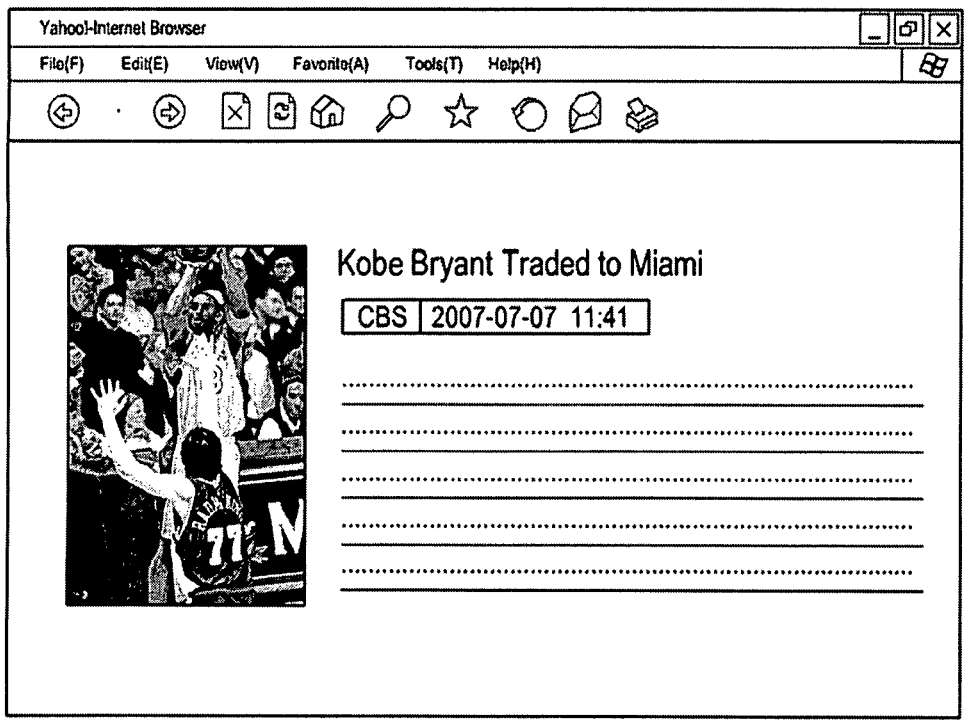

Meanwhile, the client of the user terminal 120, upon receiving the content web page from the web server 131, may prepare a content web page display screen in accordance with the received content. FIG. 2b illustrates the web page received in response to the content web page request for the hyperlink no. 1 (i.e., "Kobe Bryant Traded to Miami") of FIG. 2a and displayed on the screen of the user terminal 120 is shown in FIG. 2b. The user, after viewing the displayed content, may move to another web page provided by the web service system 130. For example, the user may return to the initial web page (i.e., the gateway page of Yahoo! Website) by clicking the "Yahoo!" logo icon shown in the content web page. In this instance, the client of the user terminal 120 transmits a request for the corresponding web page to the web server 131. The web page request may include a client ID of the client. If the web page request is a content web page request, then it may further include a content ID.

The web server 131, upon receiving the web page request from the user terminal 120, may extract the client ID from the received web page request and determine if the requested web page is a web page containing at least one hyperlink. If at least one hyperlink is to be included in the requested web page, then the web server 131 may access the client history server 133 to obtain from the client history information at least one content ID corresponding to the extracted client ID. The web server 131 may identify, through the obtained content IDs, the content previously accessed by the client that transmitted the content request.

Meanwhile, the web server 131 may access the content repository server 132 to obtain information stored thereto on at least one candidate hyperlink (i.e., candidate hyperlink information). The candidate hyperlink information may include a URL of the content linked to the corresponding candidate hyperlink. The URL may include a content ID. Additionally, the candidate hyperlink information may further include at least one of the content title, a tag, a weight and a timestamp of the corresponding hyperlink. The technical details regarding the tag and weight are found in the ensuing descriptions.

The web server 131 may use the content ID obtained from the client history server 133 to select from the candidate hyperlinks obtained from the content repository server 132 the hyperlinks to be included in the web page, which is to be transmitted to the user terminal 120. In one embodiment, the web server 131 may exclude from the candidate hyperlink pool the candidate hyperlinks having the same content ID as one of those obtained from the client history server 133. Accordingly, the web service system 130 may automatically provide the hyperlinks linked to fresh content relative to the requesting user.

In addition to the aforementioned configurations, the web service system 130 may employ a tag to identify which type of content the corresponding user prefers and to provide appropriate hyperlinks to the corresponding user. More specifically, the tag is an indicator indicating at least one category of the corresponding content. The tag may be used to classify the content into various categories. In one embodiment, the tag may indicate a plurality of hierarchical categories. In one embodiment, with respect to the example regarding the news article on Kobe Bryant, who is a basketball player affiliated with the National Basketball Association (NBA), the tag "Sports>Basketball>NBA>KobeBryant" may be assigned to the corresponding article. In the above example, it can be seen that the tag consists of 4 hierarchical categories.

In one embodiment, the tag for each content item provided by the web service system 130 can be manually assigned by a web site operator. In another embodiment, the tag may be automatically assigned by using a predetermined classification algorithm. Various classification algorithms, such as a taxon extraction method, are known in the field. In yet another embodiment, the tag may be assigned by using both manual and automatic methods.

The web server 131 may obtain the tag for each of the content ID obtained from the client history server 133 and identify which types of content the user of the client prefers. In one embodiment, the web server 131 may have a tag table that includes at least one content ID and at least one tag corresponding thereto. An example tag table is illustrated in FIG. 3b. The web server 131 may retrieve from the tag table the tag corresponding to each of the content ID obtained from the client history server 133.

In the example using the tag table, the web server 131 having a tag table, upon receiving a content request from the user terminal 120, may extract the client and content IDs from the received content request and retrieve the tag corresponding to the extracted content ID. Thereafter, the web server 131 transmits the obtained client and content IDs and the retrieved tag to the client history server 133. The client history server 133 may store, in addition to the client and content IDs, the tag for each of the content IDs as the client history information. In this example, the client history information may further include a tag for each of the content IDs shown in FIG. 3b. Further, the client history server 133 may calculate the tag preference information per the client ID based on the tags received from the web server 131.

The tag preference information indicates the relative user preference regarding the tags provided by the web service system 130. For example, the tag preference information may be calculated by adding the frequency of user access per category or per tag. In one example, the tag preference information ma) be information indicating the tag of the content most recently accessed by the corresponding client. In another example, the preference information may be information obtained by analyzing the tag of respective contents accessed by the corresponding client within a predetermined time period. In this example, the tag information may indicate the access pattern related to the tag for the corresponding client for the predetermined time period.

Thereafter, the web server 131 may receive from the client of the user terminal 120 a new request regarding a web page containing hyperlink-s. The web server 131, when determining the hyperlinks to be included in the requested web page, may obtain from the client history server 133 the content ID, the tag and/or the tag preference information included in the client history information.

In another embodiment, instead of using the tag table, the tag of a content ID may be placed in the content request. The web server 130 may extract from the content request the client ID, content ID and the tag to transmit them to the client history server 133. In an example using the content request including the tag, the web server 131, when providing the web page including the hyperlinks to the client, provides to the client the hyperlink with the tag included thereto. Generally, a hyperlink contains the URL of the content linked to the corresponding hyperlink. In the above example, the system 130 may employ for the hyperlinks the URL including not only the content ID but also the tag assigned thereto by the operator or the classification algorithm of the system 130. Thus, the client, upon receiving the web page containing the hyperlinks from the web server 131, may put the content ID and the tag included in the hyperlink into the content request and transmit the content request to the web server 131. The web server may extract from the transmitted content request the client ID, the content ID and the tag and transfer them to the client history server 133. The client history server 133 may store, in addition to the transferred client and content IDs, the transferred tag for each of the content IDs as the client history information. Further, the client history server 133 may calculate the tag preference information per client ID based on the tags received from the web server 131. Thereafter, the web server 131, upon receiving a new request for a web page containing hyperlinks from the client of the user terminal 120, obtains from the client history server the content IDs and the tags thereof in the client history information to select the hyperlinks to be included in the web page.

The web server 131, upon receiving the content IDs and the tags thereof, may transmit the obtained tag or the tag preference information to the content repository server 132. The content repository server 132 may retrieve from the candidate hyperlink information stored therein the hyperlink candidate information on the candidate hyperlinks related to the tag or the tag preference information received from the web server 131. It may then return to the web server 131 with the retrieved information.

Also, the web server 131, upon receiving the content IDs and the tags thereof, may select from the candidate hyperlinks provided by the content repository server 132 at least one hyperlink to be included in the web page using the obtained content IDs and the tags. In one embodiment, when tag preference information is not received from the client history server 133, the web server 131 may use the obtained tags to calculate the tag preference information for the corresponding user. For example, examining the client history information and the tag table shown in FIGS. 3a and 3b, it can be seen that the client identified as C1 prefers content with the tag related to "Sports," "Basketball" and "Kobe Bryant" categories. In the above example, the web server 131 may only search the candidate hyperlinks with tags indicating at least one of the "Sports," "Basketball" and "Kobe Bryant" categories and may select the hyperlink to be included in the web page among the retrieved candidate hyperlinks.

Further to the above configurations, the web service system 130 may assign a weight value to each of the content objects to represent the user preference of the corresponding content. For example, as to the news article, recent news articles are preferred over the old news articles. Thus, each of the content objects may be assigned with different weight values depending on the time the corresponding content was generated. As mentioned above, the information for each of the candidate hyperlinks stored in the content repository server 132 may include the weight value for each of the candidate hyperlinks. In the aforementioned example, the web server 131 may only search the candidate hyperlinks related to the tag indicating the "Sports" and "Basketball" categories and may select the hyperlink to be included in the web page among the retrieved candidate hyperlinks.

Figure 2C:
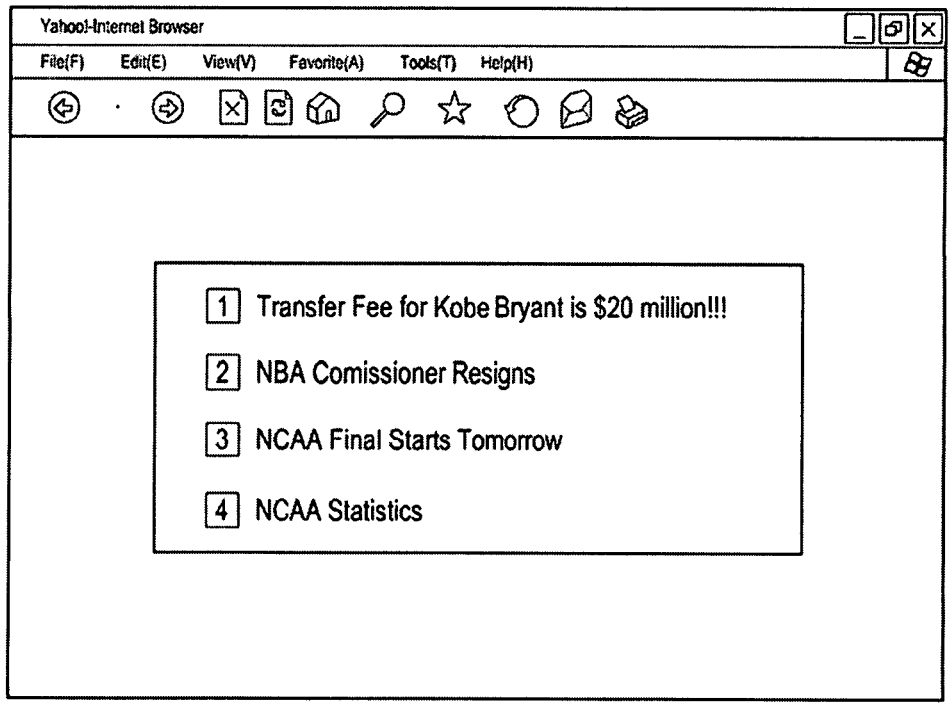

The web server 131, upon selecting the hyperlinks to be included in the web page by using one and combination of the aforementioned example methods, may generate the web page with the selected hyperlinks and may transmit the generated web page to the client of the user terminal 120. In this connection, FIG. 2c illustrates an example web page displayed on the screen of the user terminal 120. Referring to FIGS. 2a-2c, the user may view the news article (see FIG. 2b) linked to one of the hyperlink displayed in the screen of FIG. 2a by clicking the corresponding hyperlink. Thereafter, when the user returns to the initial web page, the hyperlink previously accessed by the user is replaced with a new hyperlink (i.e., "Transfer fee for Kobe Bryant is $20 million!!!"), which is closely related to the news article the user has viewed (see FIG. 2c). In the example regarding FIGS. 2a-2c, only the hyperlink accessed by the user (i.e., hyperlink no. 1) is replaced. However, other hyperlinks (e.g., hyperlink nos. 2-4) may also be replaced by the web server 131 based on the client history information. Through the aforementioned configurations, the web service system 130 may effectively manage the hyperlinks provided thereby.

Figure 4:
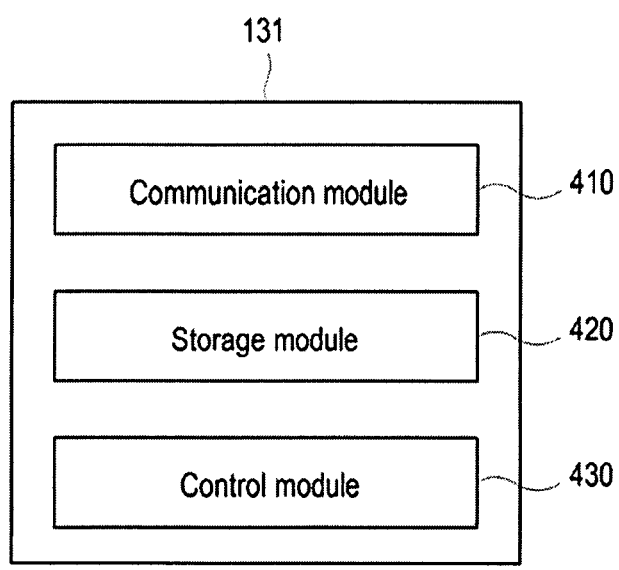
FIG. 4 illustrates a detailed block diagram of a web server according to one embodiment of the present invention.

FIG. 4 illustrates a detailed block, diagram of the web server according to one embodiment of the present invention. Referring to FIG. 4, the web server 131 includes: a communication module 410 for communicating with a user terminal 131 (especially, the client of the user terminal 120); a content repository server 132; a client history server 133 and other network entities connected to the web server 131 or a communication network 110; a storage module 420 for storing a tag table; and a control module 430 for controlling the overall operation, especially storage and communication of the web page, of the web server 131.

The control module 430 may receive from the client a request for a web page, which may include a client ID of the client, and obtain from the client history server 133 at least one content ID corresponding to the client ID of the client. The control module 430 may access the content repository server 132 to select at least one hyperlink to be included in the web page among the candidate hyperlinks stored in the content repository server 132 based on the at least one obtained content ID.

In one embodiment, the control module 430 may obtain at least one of a tag for each of the content ID obtained from the client history server 133 and tag preference information for the client ID of said client and selects the hyperlink to be included in the web page based on said tag and said tag preference information. In one embodiment using a tag table, the control module 430 may prepare at the web server 133 the tag table, which may comprise at least one content ID and at least one tag corresponding thereto, and may search a tag corresponding to each of the content ID obtained from the client history server 133 by using the prepared tag table. In another embodiment using the tag table, the control module 430 may select among each of the candidate hyperlinks at least one hyperlink with a tag identical or similar to the tag of each of the content ID obtained from the client history server 133 as the hyperlink to be included in the web page. In one embodiment, the control module 430 may select the at least one hyperlink to be included in the web page among the candidate hyperlinks based on a weight value assigned to each of the candidate hyperlinks.

In one embodiment, the control module 430 may provide to said client a web page comprising at least one hyperlink, each of said hyperlink being linked with a content, and receive from said client a request for the content linked to the at least one hyperlink. The content request may include a client ID of the client and a content ID of the linked content. The control module 430 may transmit to the client history server 133 the client ID and the content ID included in said content request.

Figure 5:
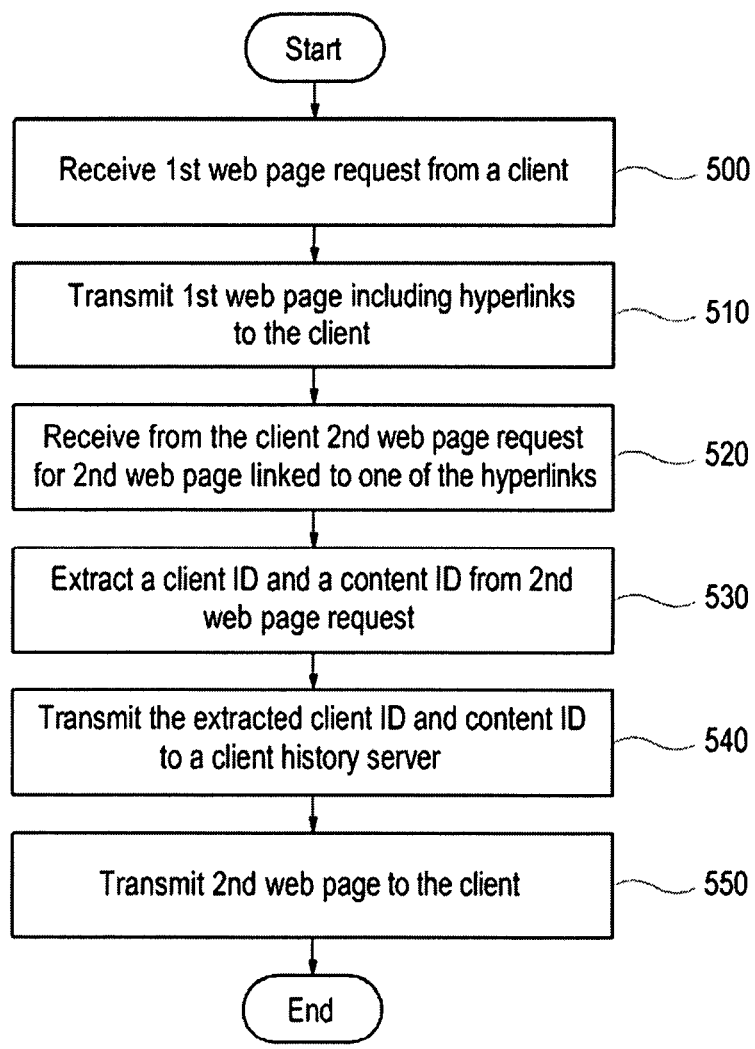
FIG. 5 illustrates a flow chart to explain the process of storing client history information according to one embodiment of the present invention.

FIG. 5 illustrates a flow chart to explain an example process of storing client history information according to one embodiment of the present invention. Referring to FIG. 5, a web server 131 (FIG. 1) receives a first web page request, which requests a first web page, from a client of a user terminal 120 (operation 500). Here, the first web page request may be a request for a web page containing at least one hyperlink. In operation 510, the web server 131 transmits the first web page including the hyperlinks to the client. In operation 520, the web server 131 receives from the client a second web page request for the second web page linked to one of the hyperlinks of the first web page and extracts a client ID and a content ID from the second web page request (operation 530). Here, the second web page may be a content web page. Thereafter, the web server 131 transmits the extracted client ID and content ID to a client history server 133 (operation 540). The web server 131 then transmits the second web page to the client (operation 550) and aborts the process.

Figure 6:
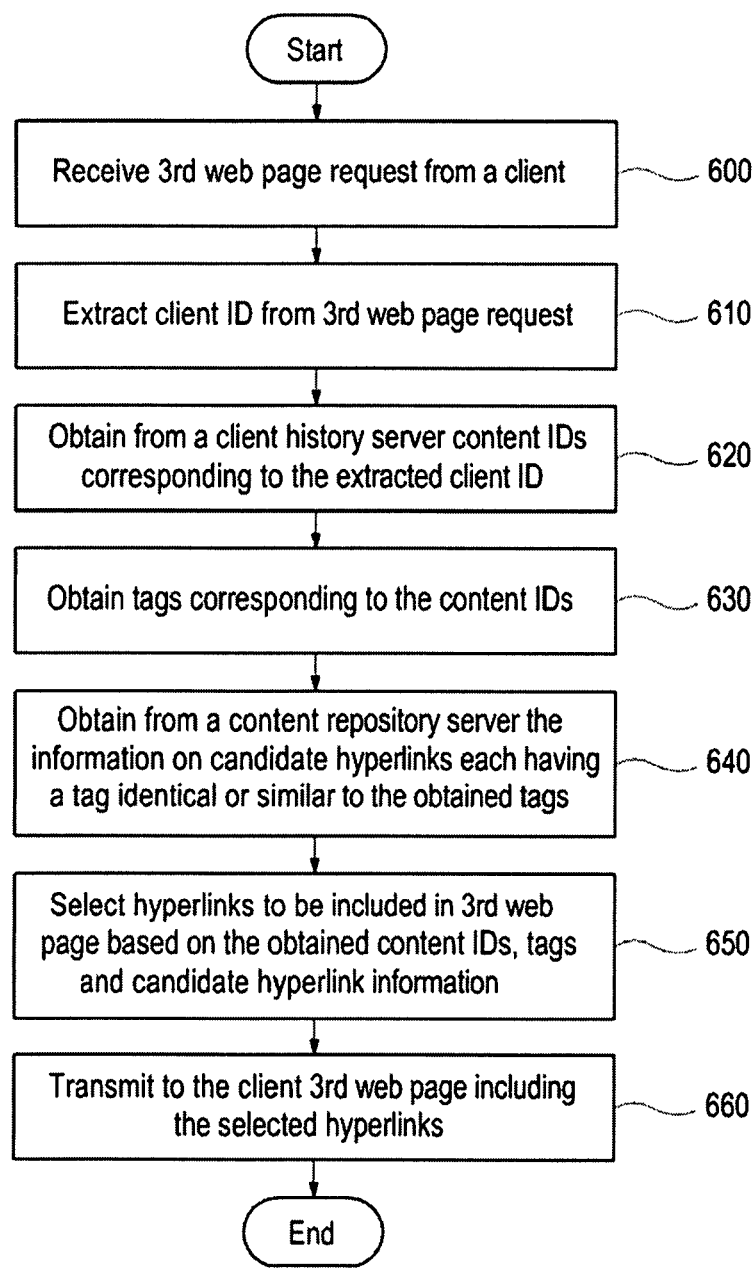
FIG. 6 illustrates a flow chart to explain the process of generating a web page according to one embodiment of the present invention.

FIG. 6 illustrates a flow chart to explain the process of generating a web page according to one embodiment of the present invention. Referring to FIG. 6, a web server 131 receives a third web page request, which requests for a third web page, from a client of a user terminal 120 (operation 600). Here, the third web page request may be a request for a web page including at least one hyperlink. In operation 610 the web server 131 extracts a client ID from the third web page request and obtains from a client history server 133 the content IDs corresponding to the extracted client ID (operation 620). In operation 630, the web server 131 obtains tags corresponding to the content IDs. In operation 640, the web server 131 obtains from a content repository server 132 the information on candidate hyperlinks each having a tag identical or similar to the obtained tags. In operation 650, the web server 131 selects the hyperlinks to be included in the third web page based on the obtained content IDs, tags and candidate hyperlink information. In operation 660, the web server 131 transmits to the client the third web page including the selected hyperlinks and aborts the process.

Figure 7:
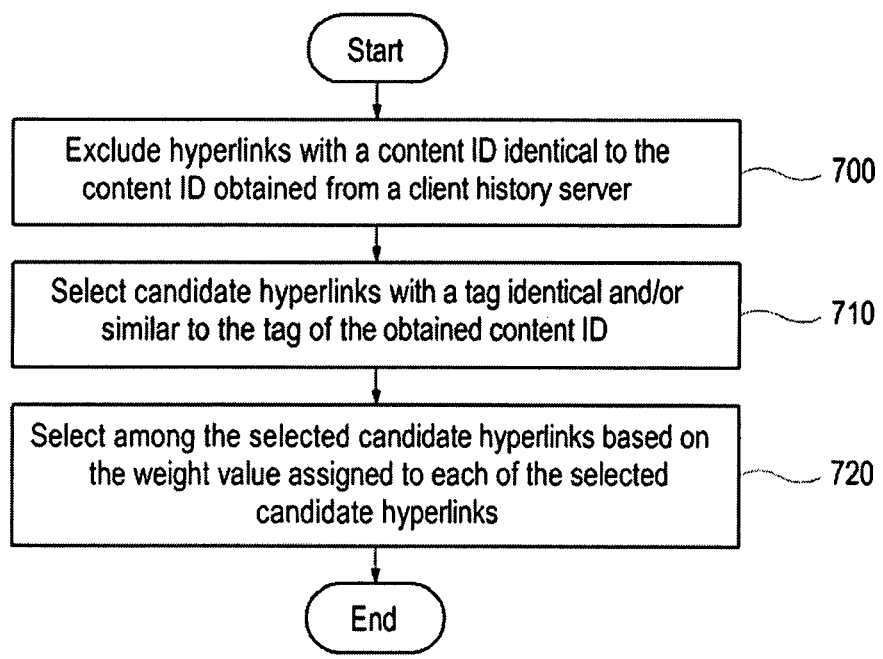
FIG. 7 illustrates a flow chart to explain the process of selecting hyperlinks to be included in a web page according to one embodiment of the present invention.

FIG. 7 illustrates a flow chart to explain the process of selecting hyperlinks to be included in a web page according to one embodiment of the present invention. Referring to FIG. 6, a web server 131 excludes from a pool of candidate hyperlinks the hyperlinks with a content ID identical to the content ID obtained from a client history server 133 (operation 700). In operation 710, the web server 131 selects from the pool the candidate hyperlinks with a tag identical and/or similar to the tag of the obtained content ID. In operation 720, the web server 131 selects among the candidate hyperlinks selected in operation 710 the hyperlinks to be included in a web page based on the weight value assigned to each of the selected candidate hyperlinks.

In explaining the embodiments illustrated in FIGS. 1-7, the client history information was described as being stored in the client history server 133 of the web site system 130. The client history server 133 enables one to centrally manage the client history information for a plurality of clients and to effectively manage a large quantity of the client history information.

When the quantity of the client history information for each client is relatively small, instead of employing a separate client history server to store the client history information, each user terminal of the client may store its own client history information. According to this example, each client may store the corresponding client history information and may transmit to the web server a web page request with the stored client history information. For example, the client history information may be encoded in a browser cookie that is appended to web page requests. In this instance, the web server (instead of referring to the client history server) may use the client history information received from the client to determine among the candidate hyperlinks stored in the content repository server the hyperlinks to be included in the web page generated in response to the web page request received from the client.

In an embodiment that stores the client history information at the client, each client may store the content ID of the content most recently accessed by the corresponding client as the client history information and, when the user of the corresponding client clicks a hyperlink displayed on the displace screen of the corresponding client, may transmit further to a web page request the stored client history information (e.g., the content ID of the content most recently accessed by the client), which may be stored in a cookie, to the web server. The web server, upon receiving the web page request and the cookie, may generate a web page with hyperlinks based on the client history information stored in the cookie, update the client history information in the received cookie and transmit the generated web page together with the updated cookie. Accordingly, the web server may effectively manage per client the hyperlinks to be included in a web page without employing additional hardware resources such as the client history server.

Figure 8:
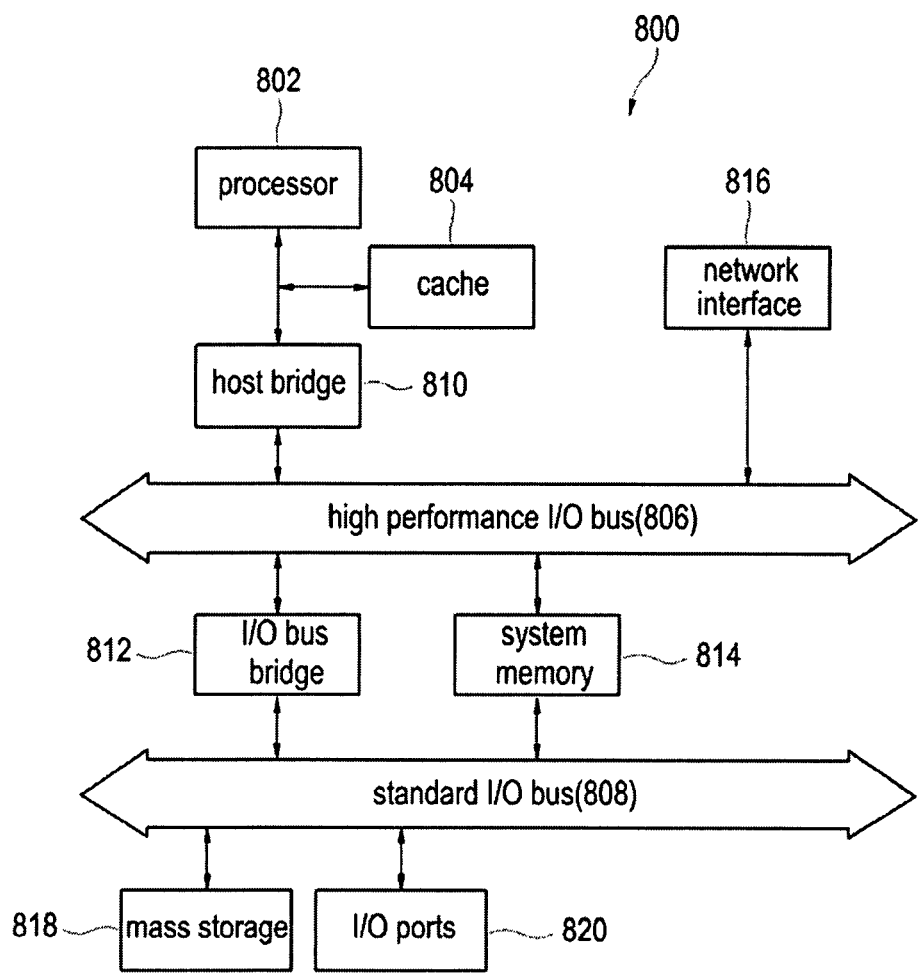
FIG. 8 illustrates an example computing system architecture, which may be used to implement embodiments of the present invention.

While the methods and systems of the present invention have been described above with reference to specific embodiments, some or all of the elements or operations thereof may be implemented by using a computer system having a general purpose hardware architecture. FIG. 8 illustrates an example computing system architecture, which may be used to implement the above-described embodiments and which may be used to perform one or more of the processes or elements described herein. In one implementation, the hardware system 800 includes a processor 802, a cache memory 804 and one or more software applications and drivers directed to the functions described herein.

Additionally, the hardware system 800 includes a high performance input/output (I/O) bus 806 and a standard I/O bus 808. A host bridge 810 couples the processor 802 to the high performance I/O bus 806, whereas the I/O bus bridge 812 couples the two buses 806 and 808 with each other. A system memory 814 and a network/communication interface 816 couple to the bus 806. The hardware system 800 may further include a video memory (not shown) and a display device coupled to the video memory. A mass storage 818 and I/O ports 820 are coupled to the bus 808. The hardware system 800 may optionally include a keyboard and pointing device, as well as a display device (not shown) coupled to the bus 808. Collectively, these elements are intended to represent a broad category of computer hardware systems including, but not limited to, the general purpose computer systems based on the Pentium® processor manufactured by Intel Corporation of Santa Clara, Calif., as well as any other suitable processors.

The elements of the hardware system 800 are described in greater detail below. In particular, the network interface 816 provides communication between the hardware system 800 and any one of a wide range of networks such as an Ethernet (e.g., IEEE 802.3) network, etc. In case of the web server 131, the content repository server 132 and the client history server 133, the network interface 816 interfaces between the hardware system 800 and the network connected to the user terminal 120 for allowing the hardware system 800 to communicate with those terminals. Similarly, in case of the user terminal 120, the network interface 816 interfaces between the hardware system 800 and the network connected to the web server 131, the content repository server 132 and the client history server 133 for allowing the hardware system 800 to communicate with those servers. The mass storage 818 provides permanent storage for the data and programming instructions to perform the above-described functions implemented in the user terminal 120, the web server 131, the content repository server 132 and the client history server 133, whereas the system memory 814 (e.g., DRAM) provides temporary storage for the data and programming instructions when executed by the processor 802. The I/O ports 820 are one or more serial and/or parallel communication ports that provide communication between additional peripheral devices, which may be coupled to the hardware system 800.

The hardware system 800 may include a variety of system architectures. Further, various components of the hardware system 800 may be rearranged. For example, the cache 804 may be on-chip with the processor 802. Alternatively, the cache 804 and the processor 802 may be packed together as a "processor module," with the processor 802 being referred to as the "processor core." Furthermore, certain implementations of the present invention may not require or include all of the above components. For example, the peripheral devices shown coupled to the standard I/O bus 808 may be coupled to the high performance I/O bus 806. In addition, in some implementations, only a single bus may exist, with the components of the hardware system 800 being coupled to the single bus. Furthermore, the hardware system 800 may include additional components such as additional processors, storage devices or memories. As discussed below, in one embodiment, the operations of the web service system 130 including the web server 131, the content repository server 132 and the client history server 133 described herein are implemented as a series of software routines run by the hardware system 800. These software routines comprise a plurality or series of instructions to be executed by a processor in the hardware system such as the processor 802. Initially, the series of instructions are stored in a storage device such as the mass storage 818. However, the series of instructions can be stored in any suitable storage medium such as a diskette, CD-ROM, ROM, EEPROM, etc. Furthermore, the series of instructions need not be stored locally and could be received from a remote storage device, such as a server on a network, via the network/communication interface 816. The instructions are copied from the storage device, such as the mass storage 818, into the memory 814 and then accessed and executed by the processor 802.

An operating system manages and controls the operation of the hardware system 800, including the input and output of data to and from software applications (not shown). The operating system provides an interface between the software applications being executed on the system and the hardware components of the system. According to one embodiment of the present invention, the operating system is the Windows® 95/98/NT/XP/Vista operating system, which is available from Microsoft Corporation of Redmond, Wash. However, the present invention may be used with other suitable operating systems, such as the Apple Macintosh Operating System available from Apple Computer Inc. of Cupertino, Calif., UNIX operating systems, LINUX operating systems and the like.

Advantageously, the present invention provides a method and apparatus for automatically replacing hyperlinks in a web page provided by a web service system based on user preferences. While the present invention has been shown and described with respect to a preferred embodiment, those skilled in the art will recognize that various changes and modifications may be made without departing from the spirit and scope of the present invention as defined in the appended claims.

What is claimed is:

1. A method of managing a hyperlink provided by a web service system, said web service system comprising a web server configured to provide a web page to a client, a content repository server configured to store at least one of candidate hyperlinks and a client history server, said method comprising:

storing, in a client history sever hosted by a computing device, client history information, said client history information comprising one or more client identifiers (IDs) and, for each of the one or more client identifiers, one or more content IDs corresponding to content that has been previously requested by a user associated with the client ID;

receiving, from a client at a second computing device, a request for a web page, said web page request comprising a client ID of said client;

obtaining, by said second computing device, from said client history server at least one content ID corresponding to the client ID of said client;

selecting one or more hyperlinks to be included in the web page among a set of candidate hyperlinks stored in said content repository server in association with the web page based on the at least one obtained content ID; and replacing, in the web page, each hyperlink that has been accessed by the client with a new hyperlink that has not been accessed by the client.

2. The method of claim 1, further comprising obtaining at least one of a tag for each of the content ID obtained from said client history server and tag preference information for the client ID of said client, wherein the tag indicates a category of the content corresponding to the content ID; and said selecting the one or more hyperlinks comprises selecting a hyperlink to be included in the web page based on said tag and said tag preference information.

3. The method of claim 2, wherein said storing comprises:

storing in said client history server at least one of the tag for each content ID stored in the client history server and the tag preference information for each client ID stored in the client history server; and said obtaining at least one of the tag or the tag preference information comprises obtaining from said client history server at least one of the tag and the tag preference information stored in the client history server.

4. The method of claim 2, wherein said obtaining the tag comprises:

maintaining a tag table, said tag table comprising at least one content ID and at least one tag corresponding thereto; and searching a tag corresponding to each of the content ID obtained from the client history server by using the prepared tag table.

5. The method of claim 2, wherein said selecting the one or more hyperlinks comprises
selecting among each of the candidate hyperlinks at least one hyperlink with a tag identical or similar to the tag of each of the content ID obtained from the client history server as the hyperlink to be included in the web page.

6. The method of claim 5, wherein said selecting the one or more hyperlinks further comprises:
selecting the at least one hyperlink to be included in the web page among the candidate hyperlinks based on a weight value assigned to each of the candidate hyperlinks.

7. The method of claim 1, wherein said storing the client history server comprises:
providing to said client a web page comprising at least one hyperlink, each of said hyperlink being linked with a content;
receiving from said client a request for the content linked to the at least one hyperlink, said content request including a client ID of the client and a content ID of the linked content; and
transmitting to said client history server the client ID and the content ID included in said content request.

8. The method of claim 7, wherein said content request further comprises a tag for the content ID of the linked content; and
said transmitting comprises transmitting to said client history server the tag for the linked content ID.

9. A web server configured to manage a hyperlink of a webpage provided by a web service system, said server comprising:
a network interface;
a memory;
a processor;
a communication module configured to communicate with a client, a client history server storing client history information and a content repository server storing at least one candidate hyperlink, said client history information including one or more client identifiers (IDs) and, for each of the one or more client identifiers, one or more content IDs corresponding to content that has been previously requested by a user associated with the client ID; and
a control module configured to
receive from said client a request for a web page, said web page request comprising a client ID of said client;
obtain from said client history server at least one content ID corresponding to the client ID of said client;
select one or more hyperlinks to be included in the web page among the candidate hyperlinks stored in said content repository server based on the at least one obtained content ID; and
replace, in the web page, each hyperlink that has been accessed by the client with a new hyperlink that has not been accessed by the client.

10. The server of claim 9, wherein said control module is further configured to
obtain at least one of a tag for each of the content ID obtained from said client history server and tag preference information for the client ID of said client, wherein the tag indicates a category of the content corresponding to the content ID; and
select the one or more hyperlinks to be included in the web page based on said tag and said tag preference information.

11. The server of claim 10, wherein said control module prepares at said web server a tag table, said tag table comprising at least one content ID and at least one tag corresponding thereto and searches a tag corresponding to each of the content ID obtained from the client history server by using the prepared tag table.

12. The server of claim 10, wherein said control module selects among each of the candidate hyperlinks one or more hyperlinks with a tag identical or similar to the tag of each of the content ID obtained from the client history server as the one or more hyperlinks to be included in the web page.

13. The server of claim 12, wherein said control module selects the one or more hyperlinks to be included in the web page among the candidate hyperlinks based on a weight value assigned to each of the candidate hyperlinks.

14. The server of claim 9, wherein said control module provides to said client a web page comprising one or more hyperlinks, each of said hyperlinks being linked with a content, receives from said client a request for the content linked to the one or more hyperlinks, said content request including a client ID of the client and a content ID of the linked content and transmits to said client history server the client ID and the content ID included in said content request.

15. A web service system for providing a web page to a client, the system comprising:
a client history server, hosted on a first computing device, configured to store client history information, said client history information including one or more client identifiers (IDs) and, for each of the one or more client identifiers, one or more content IDs corresponding to content that has been previously requested by a user associated with the client ID;
a content repository server, hosted on a second computing device, configured to store at least one candidate hyperlink; and
a web server, hosted on a third computing device, configured to
receive from said client a request for a web page, said web page request comprising a client ID of said client,
obtain from said client history server at least one content ID corresponding to the client ID of said client,
select one or more hyperlinks to be included in the web page among the candidate hyperlinks stored in said content repository server based on the at least one obtained content ID, and
replace, in the web page, each hyperlink that has been accessed by the client with a new hyperlink that has not been accessed by the client.

16. The system of claim 15, wherein:
said client history server stores a tag for each of the content ID stored in the client history information;
said content repository server stores a tag for each of the candidate hyperlinks stored in the content repository server; and
said web server obtains from said client history server a tag for each of the obtained content IDs, obtains from said content repository server a tag for each of the candidate hyperlinks, and selects at least one hyperlink to be included in the web page based on the obtained tags.

17. A method of managing a hyperlink provided by a web service system, said web service system comprising a web server configured to provide a web page to a client and a content repository server configured to store at least one of candidate hyperlinks, said method comprising the steps of:
receiving, from a client at a computing device, client history information and a request for a web page, said client history information comprising at least one content ID corresponding to content previously requested by the client and said web page request comprising a client ID of said client;

selecting one or more hyperlinks to be included in the web page among the candidate hyperlinks stored in said content repository server based on the received client history information; and replacing, in the web page, each hyperlink that has been accessed by the client with a new hyperlink that has not been accessed by the client.

18. The method of claim 17, wherein said receiving comprises:

receiving said client history information in a cookie.

19. The method of claim 18, further comprising the step of:

updating the client history information stored in the cookie in response to the request for the web page.

20. A machine-readable tangible and non-transitory medium having information for managing a hyperlink provided by a web service system, wherein the information, when read by the machine, causes the machine to perform the following:

storing, in a client history server, client history information, said client history information comprising one or more client identifiers (IDs) and, for each of the one or more client identifiers, one or more content IDs corresponding to content that has been previously requested by a user associated with the client ID;

receiving, from a client, a request for a web page, said web page request comprising a client ID of said client;

obtaining from said client history server at least one content ID corresponding to the client ID of said client;

selecting one or more hyperlinks to be included in the web page among a set of candidate hyperlinks stored in said content repository server in association with the web page based on the at least one obtained content ID; and replacing, in the web page, each hyperlink that has been accessed by the client with a new hyperlink that has not been accessed by the client.

21. The medium of claim 20, the information, when read by the machine, further causing the machine to obtain at least one of a tag for each of the content ID obtained from said client history server and tag preference information for the client ID of said client, wherein the tag indicates a category of the content corresponding to the content ID; and said selecting the one or more hyperlinks comprises selecting a hyperlink to be included in the web page based on said tag and said tag preference information.

22. The medium of claim 21, the information, when read by the machine, further causing the machine to:

store in said client history server at least one of the tag for each content ID stored in the client history server and the tag preference information for each client ID stored in the client history server, wherein said obtaining at least one of the tag or the tag preference information comprises obtaining from said client history server at least one of the tag and the tag preference information stored in the client history server.

\* \* \* \* \*